(12) United States Patent
Liptak et al.

(10) Patent No.: US 7,180,759 B2
(45) Date of Patent: Feb. 20, 2007

(54) PUSH-PULL INVERTER WITH SNUBBER ENERGY RECOVERY

(75) Inventors: Julius Michael Liptak, Knightdale, NC (US); Mark John Kocher, Raleigh, NC (US); John Kenneth MacKenzie, IV, Raleigh, NC (US)

(73) Assignee: Square D Company, Palatine, IL (US)

( * ) Notice: Subject to any disclaimer, the term of this patent is extended or adjusted under 35 U.S.C. 154(b) by 84 days.

(21) Appl. No.: 10/980,006

(22) Filed: Nov. 3, 2004

(65) Prior Publication Data

US 2006/0092676 A1 May 4, 2006

(51) Int. Cl.
 *H02H 7/122* (2006.01)
(52) U.S. Cl. .................................................. 363/56.08
(58) Field of Classification Search ............. 363/56.08, 363/25, 134
 See application file for complete search history.

(56) References Cited

U.S. PATENT DOCUMENTS 4,336,587 A * 6/1982 Boettcher et al. ........... 363/134
4,607,322 A * 8/1986 Henderson ................ 363/56.08
6,295,213 B1 9/2001 Smith ....................... 363/21.01
2004/0085050 A1 5/2004 Jinno ........................... 323/247

FOREIGN PATENT DOCUMENTS

JP 60032575 2/1985 ..................... 7/538
JP 2001224172 8/2001 ........................ 3/28

* cited by examiner

*Primary Examiner*—Shawn Riley

(57) ABSTRACT

A power inverter comprises a push-pull inverter circuit that includes a transformer having a primary winding coupled to a DC bus and a secondary winding coupled to an AC bus, main power switches coupling each end of the primary winding to a DC return, and one or more supplemental power switches coupling at least one end of the primary winding to a snubber bus. The supplemental switch at a given end of the primary winding forms a buck-mode converter in combination with the primary winding and the associated free-wheeling diode at that end of the primary winding, and can be controlled by a switching controller to effect energy transfer between the snubber bus and DC bus. The switching controller can be configured to control power flow between the DC, AC, and snubber buses by controlling the common-mode and differential-mode voltages of the primary winding via main/supplemental power switch control.

27 Claims, 7 Drawing Sheets

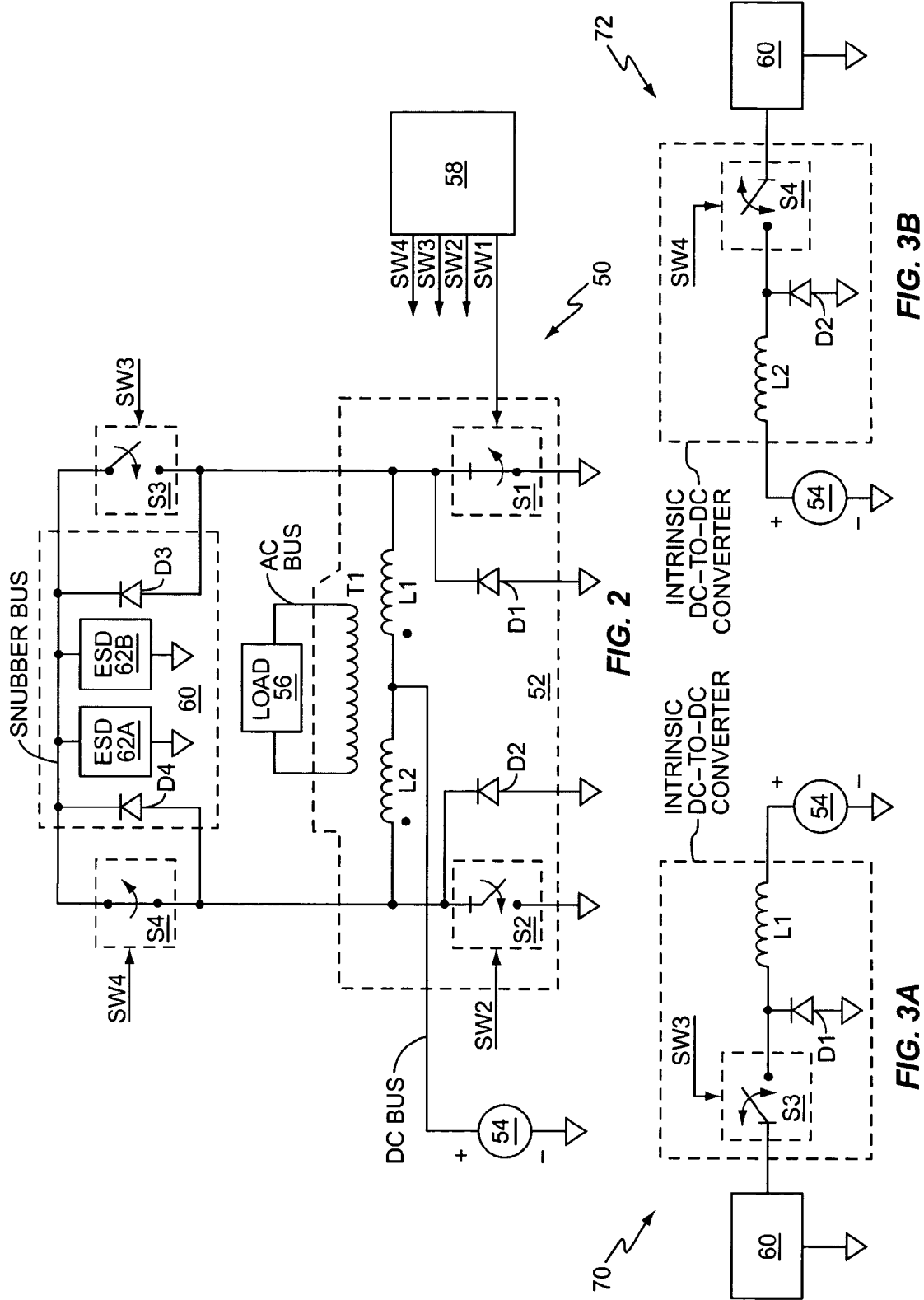

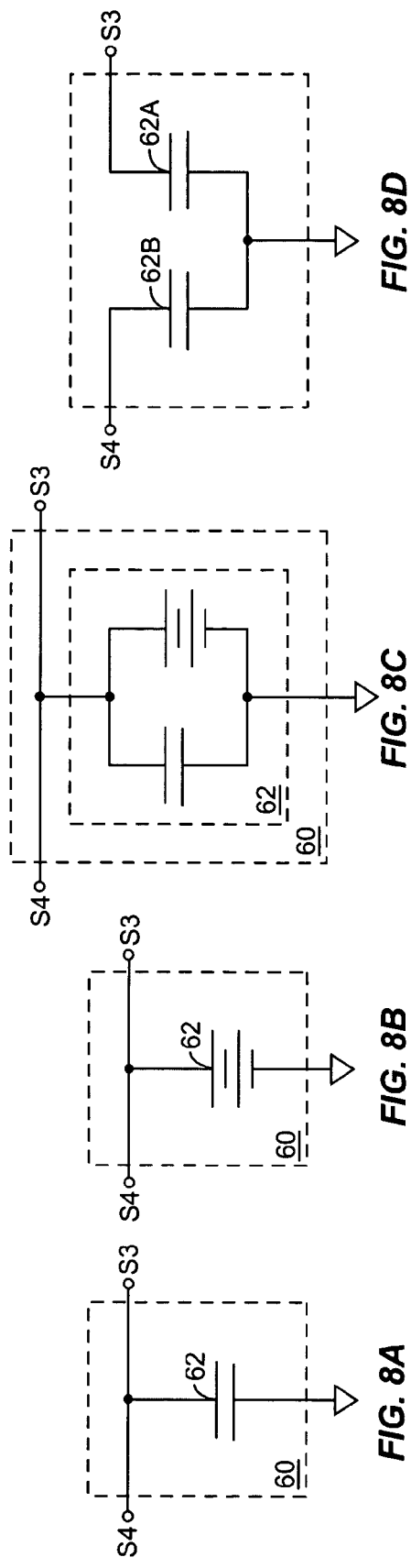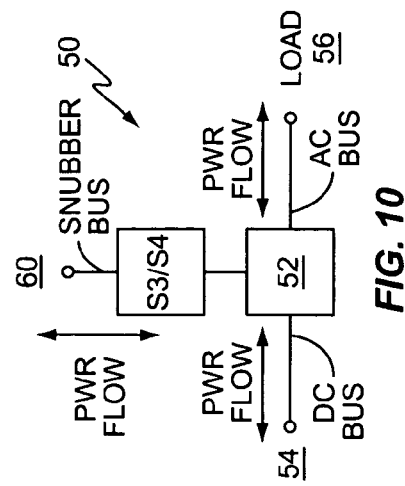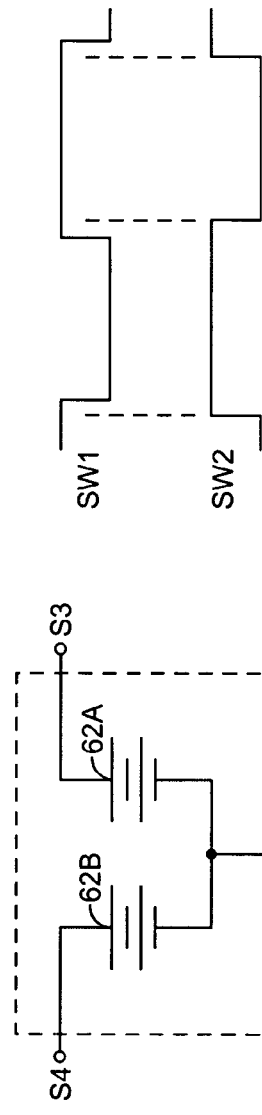

PUSH-PULL INVERTER WITH SNUBBER ENERGY RECOVERY

BACKGROUND OF THE INVENTION

The present invention generally relates to power conversion, and particularly relates to push-pull inverter circuits with snubber-based energy recovery.

Push-pull inverter circuits are commonly used in power conversion applications, such as in DC-to-AC power inverters. In terms of construction, such inverter circuits typically comprise a transformer with a switched primary winding having its center tap coupled to a source of DC power. Each end of the primary winding is coupled to a DC return through a switch, and output AC power is provided by the transformer's secondary winding based on alternately turning on one or the other switch at a desired frequency. Output voltage variations are achieved by varying the relative conduction intervals of the two switches, and the switching control signals can be generated as Pulse Width Modulation (PWM) signals of essentially any desired resolution.

As a general rule, push-pull inverter circuits must be provided with some form of a "snubber" circuit to limit switching-induced voltage transients on the primary winding. In a typical approach to snubbing, snubber diodes connect each end of the primary winding to a snubber capacitor. In this manner, the snubber diodes clamp the voltage at respective ends of the primary winding by dumping current into the snubber capacitor.

A resistive load can be used to discharge the snubber capacitor, however that approach simply dissipates the potentially significant energy captured by the snubber circuit as waste heat. In a more efficient approach, a buck converter circuit can be used to return energy from the snubber circuit to the inverter circuit's source voltage.

With this approach, a separate buck converter is added between the snubber circuit and the inverter's DC source supply. While the addition of separate buck converter for snubber energy recovery aids inverter efficiency by recovering some of the energy that otherwise would be lost to the snubber circuit, it also increases the cost and size of the inverter circuit.

SUMMARY OF THE INVENTION

The present invention provides an apparatus and method for improving, among other things, the design, construction, packaging, and operation of power inverters that make use of push-pull inverter circuits for DC-to-AC power conversion. According to one or more exemplary embodiments of the present invention, the same transformer used for DC-to-AC power conversion in the push-pull inverter circuit is also used for DC-to-DC power conversion operations associated with recovering energy from a snubber circuit of the power inverter. Using the DC-to-AC converter's transformer inductance for DC-to-DC power conversion between the snubber bus and the DC bus of the power inverter obviates the need for adding separate inductor elements to effect snubber energy recovery.

An exemplary DC-to-AC power inverter comprises a push-pull inverter circuit that includes an inverter circuit transformer having a switched primary winding. First and second switches (main power switches) and first and second free-wheeling diodes coupling respective ends of the primary winding to the return side of a DC bus, and respective ends of the primary winding are further coupled to a snubber circuit via first and second snubber diodes. According to an exemplary embodiment of the present invention, third and fourth switches (supplemental power switches) also couple respective ends of the primary winding to the snubber circuit, i.e., the third switch is parallel to the first snubber diode at the first end of the primary winding, and the fourth switch is parallel to the second snubber diode at the second end of the primary winding.

Adding the supplemental switches to the push-pull inverter circuit forms first and second DC-to-DC converters that can be switched in coordination with the main power switches to return energy from the snubber circuit to the DC bus of the push-pull inverter circuit. More particularly, the first DC-to-DC converter circuit is formed by the third switch, the primary winding of the inverter circuit's transformer, and the first free-wheeling diode associated with the first switch at the same end of the primary winding. Similarly, the second DC-to-DC converter is formed by the fourth switch, the primary winding of the inverter circuit's transformer, and the second free-wheeling diode. These DC-to-DC converters are referred to herein as "intrinsically" formed converters because they are partly formed by re-using circuit elements from push-pull inverter circuit.

While implementing both the first and second DC-to-DC converters offers certain advantages, such as additional flexibility in controlling the snubber bus energy return process, those skilled in the art should note that the present invention contemplates embodiments having only one DC-to-DC converter. That is, snubber energy can be recovered by forming just one DC-to-DC converter circuit, i.e., by adding just one supplemental switch at a given end of the push-pull inverter circuit transformer's primary winding.

In an exemplary embodiment, the main switches, and the supplemental switch, or switches, comprise transistor switches. Advantageously, then, the first and third switches can be conveniently implemented using the low-side and high-side transistors in a half-bridge transistor circuit. Likewise, the second and fourth switches at the other end of the primary winding can be implemented using another half-bridge transistor circuit.

Further, the transistor switches can comprise one or more commercially packaged circuit devices, which often include reverse-parallel diodes in the same device package. In such cases, these included diodes can serve as the required free-wheeling and snubber diodes, thus eliminating the need to include separately packaged diodes. Of course, it should be understood that the transistor switches need not include integral diodes, and that separate transistor switches and diodes can be used according to design needs. Also, it should be noted that the main power switches and supplemental switches can be integrated together in a full-bridge transistor circuit for additional size, space, and packaging improvements.

Regardless, one or more embodiments of the present invention further comprise switching control logic, which can be implemented in a switching controller circuit that controls the conduction timing (on-timing) of the included switches in coordinated fashion to effect the desired power inverter operation. By controlling the on-times of the main power switches, i.e., the first and second switches at opposite ends of the inverter circuit transformer's primary winding, switching control can effect the desired DC-to-AC conversion, and by overlapping the turn-on times of the first and second switches by a controlled amount, additionally can provide boost-mode operation wherein power flows from the inverter circuit to the snubber circuit. Such operation is advantageous where the snubber circuit includes batteries or the like.

Further, of particular interest herein, by controlling the on-times of the supplemental switch, or switches, i.e., the added high-side switches coupling the primary winding to the snubber bus, switching control can operate the DC-to-DC converters formed by the addition of those supplemental switches as buck converters that recover energy from the snubber circuit. That is, the third and fourth switches described above can be operated by the switching control logic such that the intrinsically formed DC-to-DC converters provide voltage step down from the snubber bus to the DC bus, thereby enabling a portion of the energy transferred to the snubber circuit to be recovered.

In general, an exemplary switching controller can be configured to control any or all of the first, second, third, and fourth switches to effect a desired power flow between the DC bus of the power inverter circuit, the snubber bus (or buses) of the snubber circuit, and the AC bus of the inverter output (i.e., the load or AC mains connection). With such operation, the power inverter is conveniently operated as a multi-port power flow device according to desired power flows based simply on the switching control timing imposed by the switching controller.

Broadly then, the present invention provides a power inverter comprising a push-pull inverter circuit that includes a transformer having a primary winding coupled to a DC bus and a secondary winding coupled to an AC bus, main power switches coupling each end of the primary winding to a DC return, and one or more supplemental power switches coupling at least one end of the primary winding to a snubber circuit of the power inverter. An associated or included switching controller is configured to effect desired power flow between the DC, AC, and snubber buses by controlling common-mode and differential-mode voltages of the primary winding via switching control of the main and supplemental power switches.

Such switching control can be, if desired, changed for different operating conditions, or for different power converter configurations. For example, power flow from the DC bus to the snubber bus may be desirable when batteries are used in the snubber circuit, and other DC-to-AC and AC-to-DC power flow scenarios may be desirable when alternative energy sources, such as fuel cells, etc., are used to supply DC power to the inverter.

Of course, the present invention is not limited to the above features and advantages. Those skilled in the art will recognize additional features and advantages of the present invention upon reading the following detailed description and upon viewing the accompanying figures, in which like elements are assigned like reference numbers.

BRIEF DESCRIPTION OF THE DRAWINGS

FIG. 2 is a diagram of an exemplary power inverter configured according to one or more embodiments of the present invention.

FIGS. 3A and 3B are diagrams of first and second DC-to-DC converter circuits intrinsically formed via the primary winding of the inverter transformer illustrated in FIG. 2.

FIGS. 8A–8E are diagrams of exemplary snubber circuit energy storage devices (ESDs).

FIG. 9 is a diagram of exemplary switching control signal timing for a boost mode of operation, wherein energy is transferred from the DC bus to the snubber bus of the power inverter of FIG. 4, for example.

FIG. 10 is a diagram of three-port power flow for an exemplary embodiment of a power inverter configured according to the present invention.

DETAILED DESCRIPTION OF THE INVENTION

Figure 1:
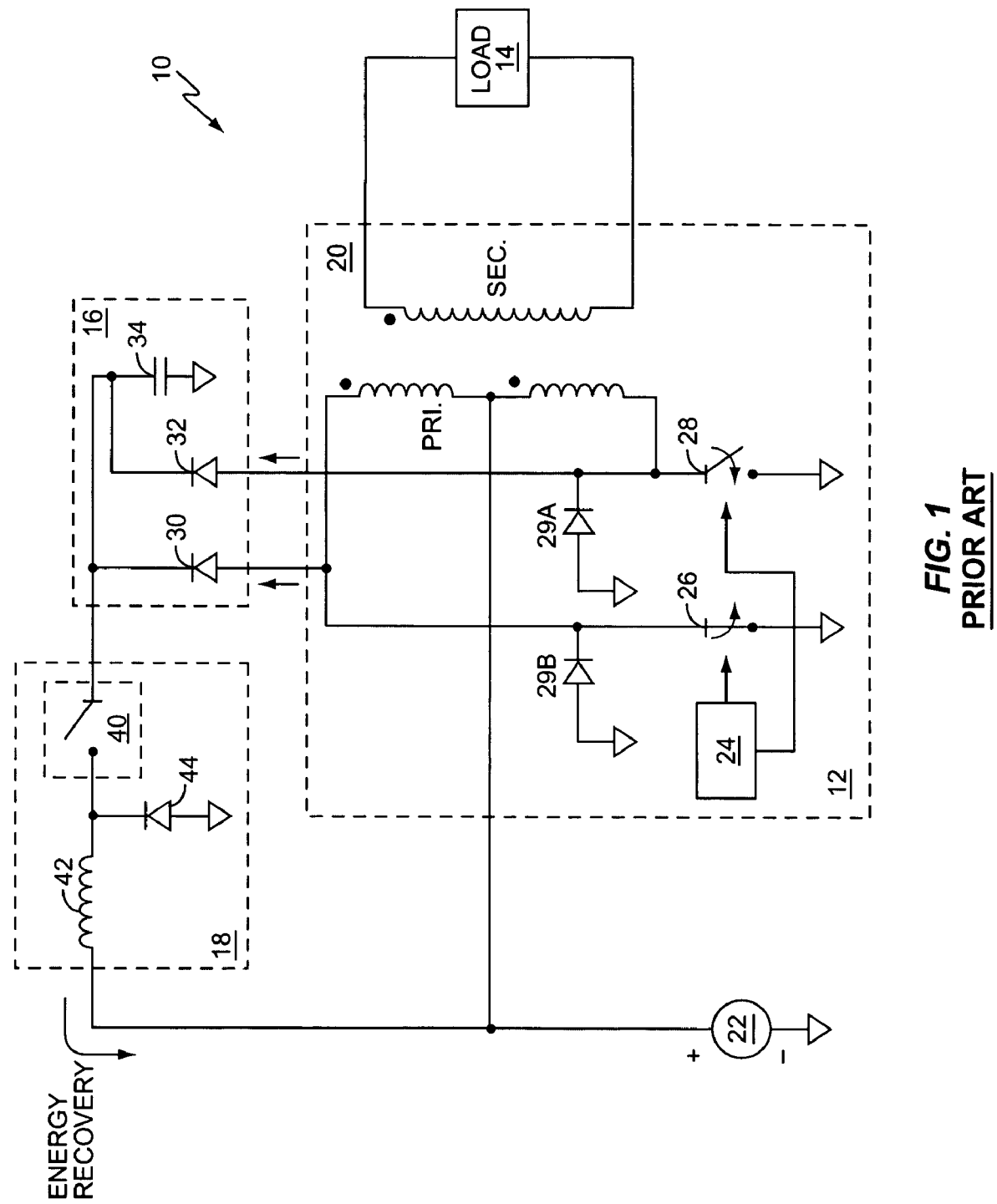
FIG. 1 is a diagram of a conventional push-pull power inverter, including an auxiliary buck converter for energy recovery.

FIG. 1 is a diagram of a conventional power inverter 10 comprising a push-pull inverter circuit 12 coupled to a load 14, a snubber circuit 16, and a buck converter circuit 18 configured to enhance inverter efficiency by recovering a portion of the energy stored in the snubber circuit 16. In operation, an inverter transformer 20 is used to convert DC power from a DC supply 22 based on a switching controller 24 opening and closing main power switches 26 and 28.

As those skilled in the art will appreciate, an AC waveform of a desired voltage can be set up on the secondary winding of transformer 20 based on alternately switching power switches 26 and 28 on and off according to a desired duty cycle. The commutation of primary winding current from first and second halves of the center-tapped primary winding by operation of switches 26 and 28 is supported by the use of free-wheeling diodes 29A and 29B, as is understood by those skilled in the art.

The generation of voltage transients at either end of the primary winding of transformer winding 20 is inherent in the switched-inductor operation of the circuit. Without some means of clamping control, such voltage transients can easily exceed the breakdown voltage ratings of the transistors commonly used as the main power switches 26 and 28, leading to failure of the push-pull inverter circuit 12. Snubber circuit 16 represents a near-universal voltage clamping solution used in the conventional power inverter 10, and includes snubber diodes 30 and 32, positioned at respective ends of the primary winding. The voltage transients arising at a first switched end of primary winding are "clamped" to the voltage of snubber capacitor 34 plus the forward voltage of snubber diode 30. Likewise, the voltage transients arising at the other switched end of the primary winding are clamped to the voltage of snubber capacitor 34 by operation of snubber diode 32.

This dumping of transient energy into snubber circuit 16 during operation of push-pull inverter circuit 12 pumps up the voltage of snubber capacitor 34, and some mechanism generally must be provided for discharging snubber capacitor 34 during circuit operation. Simplistically, a resistive load can be coupled to snubber capacitor 34 to provide a discharge patch for the snubber capacitor 34, but that approach is wasteful in terms of inverter efficiency because the energy transferred from the push-pull inverter circuit 12 into snubber circuit 16 ultimately is dissipated as waste heat in the resistive load.

Buck converter circuit 18, comprising a switch 40, an inductor 42, and a free-wheeling diode 44, provides the conventional power inverter 10 with improved efficiency by recovering a portion of the energy stored in the snubber capacitor 34 to the DC supply 22. In more detail, the conventionally formed buck converter circuit 18 provides a voltage-step down function for discharging the higher voltage snubber capacitor 34 into the DC supply, thereby improving efficiency by reducing the overall amount of energy "lost" in power inverter 10.

Added cost, size, and complexity, due to the addition of the energy recovery means, however, offset the advantages gained in operating efficiency. For example, the addition of inductor 42 and free-wheeling diode 44 represent the addition of potentially expensive and large power components. However, according to the present invention, power inverter efficiency is gained without adding significant cost, and without undesirably increasing inverter circuit component count. Further, in one or more embodiments, the present invention enables the use of pre-packaged half-bridge (H-bridge) and/or full-bridge transistor circuits, which can greatly simplify manufacturing of power inverter circuits and substantially reduce overall circuit size.

FIG. 2 illustrates an exemplary power inverter 50 configured according to one or more embodiments of the present invention. Power inverter 50 comprises a push-pull inverter circuit 52 that includes push-pull switches S1 and S2 at opposite ends of the primary winding of an inverter circuit transformer T1. Switches S1 and S2 are referred to as main power switches. The DC bus of push-pull inverter circuit 52 is coupled to a DC supply 54, while its AC bus is coupled to a load 56. Power inverter 50 further comprises a switching controller 58, and a snubber circuit 60 that is used to limit transient voltages arising from the push-pull switching of the primary winding of transformer T1.

In a departure from conventional push-pull inverter circuit design, the exemplary power inverter 50 couples snubber circuit 60 to push-pull inverter circuit 52 via switches S3 and S4 to thereby form DC-to-DC converter circuits operative to control power flow between the snubber bus and the DC bus without requiring the addition of extra inductors and diodes. Switches S3 and S4 are referred to as supplemental switches herein. More specifically, FIG. 3A illustrates that a first DC-to-DC converter 70 is formed at one end of the primary winding of T1 by the combination of switch S3, the inductor L1 of the primary winding of T1, and the free-wheeling diode D1. FIG. 3B illustrates that a second DC-to-DC converter 72 can be similarly formed at the other end of the primary winding of T1 by the combination of switch S4, inductor L2 of the primary winding of T1, and free-wheeling diode D2.

Forming DC-to-DC converters 70 and 72 using the primary winding of T1 in push-pull inverter circuit 52 saves components, i.e., it obviates the need to add additional inductors and diodes for DC-to-DC conversion. Further, it offers significant improvements in power inverter circuit packaging as the main and supplemental switches at either end of the primary winding can be implemented in a pre-packaged half-bridge transistor circuit. Notably, if the half-bridge circuit includes reverse-parallel diodes for its high-side and low-side transistor switches, then those integrated diodes can serve as the snubber and free-wheeling diodes, respectively, for one end of the primary winding.

Additionally, both main power switches S1 and S2, and both supplemental switches S3 and S4 can be included in a single, integrated full-bridge transistor circuit package, providing even greater packaging and assembly convenience. Note, too, that one of switches S3 and S4 can be omitted for even greater simplification.

Thus, the present invention broadly provides DC-to-DC conversion capabilities between the DC bus and the snubber bus based on recognizing that the inductors and diodes needed for such conversion operations are preexisting in the exemplary push-pull converter circuit 52. That is, the inductors and diodes already present in the push-pull power inverter circuit 52 can be reused for DC-to-DC power conversion between the snubber bus and the DC bus in addition to their primary use in DC-to-AC power conversion between the DC bus and the AC bus.

Because the converters 70 and 72 are implemented using circuit elements already existing in the push-pull inverter circuit 52, they can be referred to as "intrinsically formed" DC-to-DC converters. These intrinsically formed converters 70 and 72 thus reduce parts count compared to the separately-implemented buck converter circuits as used in conventional snubber circuit energy recovery (see buck converter 18 of FIG. 1).

The decision to implement one or both of the DC-to-DC converters 70 and 72 can depend on, for example, whether the snubber circuit 60 includes more than one ESD 62 and associated snubber bus. For example, if each end of the primary winding of T1 is snubbed to a different ESD 62, then converter 70 at one end of the primary winding can control energy recovery from a first one of the ESDs 62, and converter 72 at the other end of the primary winding of T1 can control energy recovery from a second one of the ESDs 62. Snubber circuit configurations with and without multiple ESDs 62 are discussed in more detail later herein.

Figure 4:
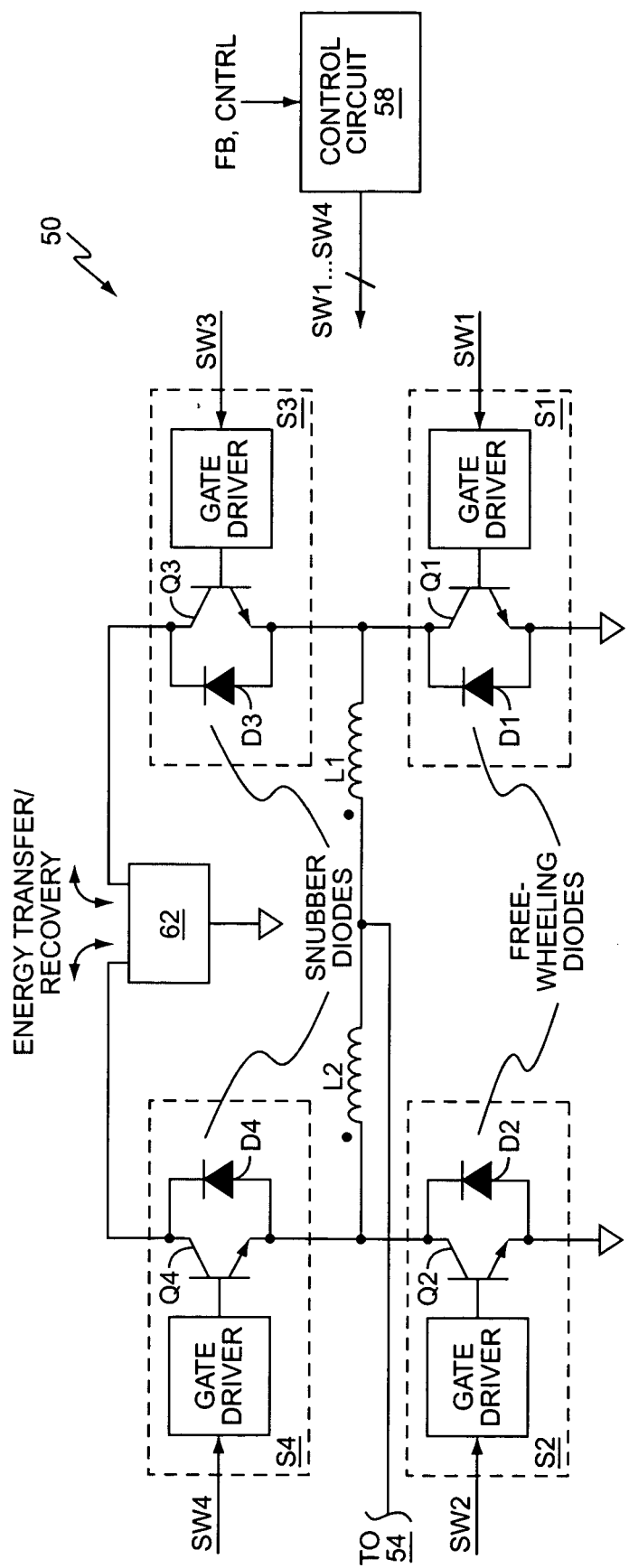
FIG. 4 is a diagram of exemplary circuit details for the power inverter of FIG. 2.

For now, however, the discussion turns to FIG. 4, where one sees an exemplary embodiment of the present invention, wherein switches S1–S4 are implemented as transistor circuits, each comprising a transistor and an associated diode, and a gate drive circuit. For example, switch S1 comprises a packaged transistor Q1 and integral diode D1, along with an appropriate gate driver circuit. Those skilled in the art will appreciate that the performance requirements of each particular application will drive component selection for the transistors and gate drivers. Further, those skilled in the art will appreciate that load 56 and any power supplies associated with the illustrated gate drivers are omitted for clarity in this diagram. On that point, those skilled in the art will appreciate that one or more floating power supplies can be configured to provide the required switching signal voltages to the gate drivers of S3 and S4.

In accordance with the embodiment illustrated in FIG. 4, the power inverter 50 comprises transistor-based switch circuits S1–S4, wherein the reverse parallel diodes D1 and D2 associated with the main power switches S1 and S2, respectively, operate as free-wheeling diodes, and the reverse parallel diodes D3 and D4 associated with supplemental switches S3 and S4, respectively, operate as snubber diodes coupling either end of the primary winding of transformer T1 to the same or different ESDs 62 in snubber circuit 60. For example, the low-side transistors Q1 and Q2 comprising switches S1 and S2, respectively, couple the respective ends of the primary winding of transformer T1 to a DC return, and thus function as low-side push-pull transistor switches, wherein their associated diodes function as the inverter free-wheeling diodes D1 and D2, first shown in the circuit of FIG. 2.

Similarly, the high-side transistors Q3 and Q4 comprising switches S3 and S4, respectively, couple the respective ends of the primary winding of transformer T1 to one or more ESDs 62 in snubber circuit 60, e.g., ESDs 62A and 62B, and thus function as the required buck converter circuit switches forming the intrinsic buck converter circuits 70 and 72. As seen in the illustration, the integral diodes of transistors Q3 and Q4 serve as the snubber diodes D3 and D4, first shown in the circuit of FIG. 2.

The space savings gained through implementation of the power inverter 50 according to the illustrated embodiment are enhanced even further by implementing transistors Q1 and Q3 as a half-bridge integrated circuit transistor pair, and by similarly implementing transistors Q2 and Q4 as another half-bridge integrated circuit transistor pair. Offering an even greater level of integration, transistors Q1–Q4 can be implemented as a full-bridge integrated circuit, such that transistors Q1–Q4 and diodes D1–D4 are implemented in a single integrated circuit package.

Regardless of whether power inverter 50 is implemented using half-bridge or full-bridge integrated transistor circuits, the intrinsically formed DC-to-DC converter circuits 70 and, optionally, 72, obviate the need to add separate buck converter inductors and accompanying free-wheeling diodes by using the primary winding of the inverter transformer T1, and its associated free-wheeling diodes D1 and D2 for the desired DC-to-DC conversion operations. Further, those skilled in the art will appreciate that a wide variety of transistor circuits are commercially available in a variety of half-bridge and full-bridge integrated circuit packages. Transistor types include, but are not limited to, bipolar transistors, MOSFETs, and IGBTs.

Figure 5:
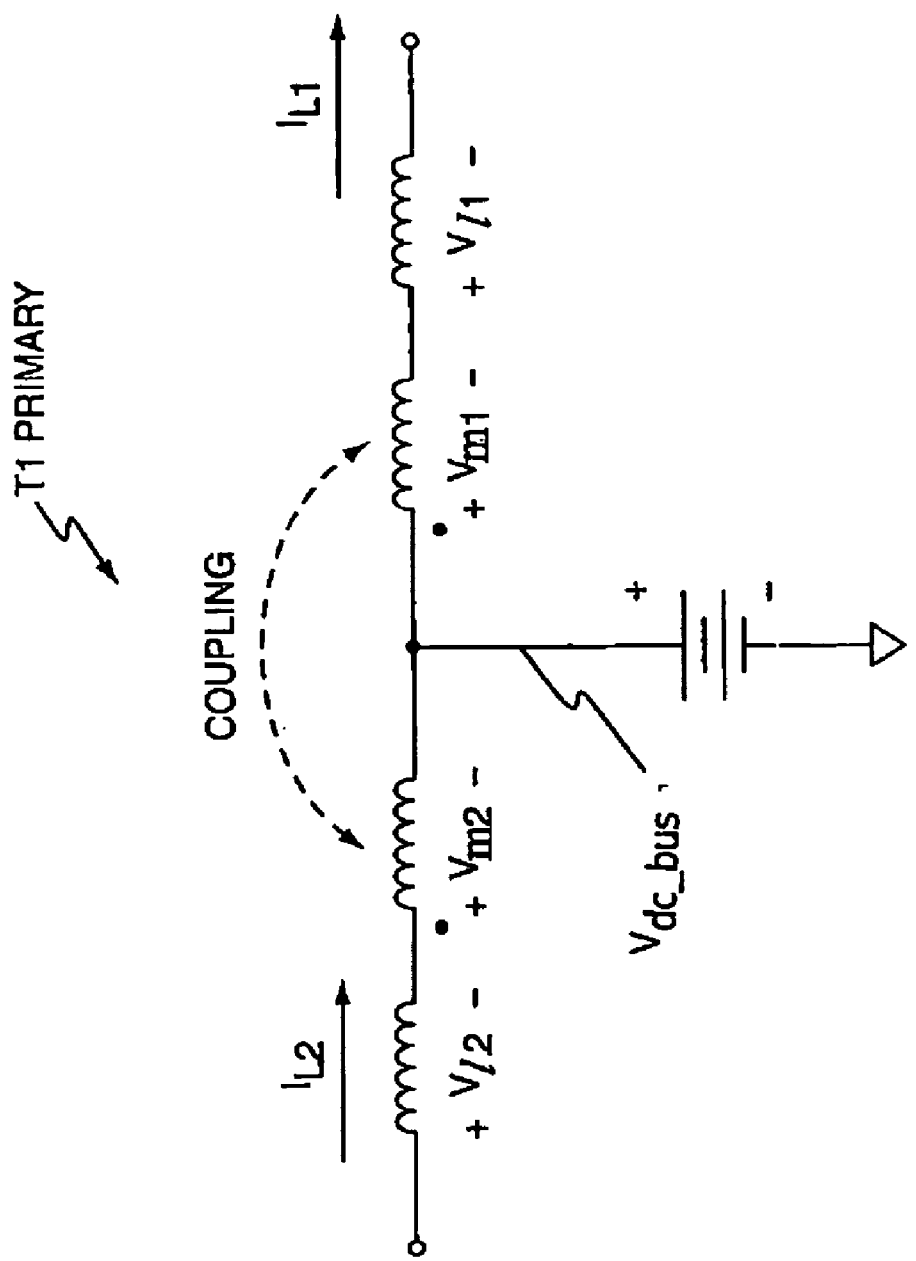
FIG. 5 is a diagram of inductances and voltages with respect to the switched primary winding of a push-pull inverter circuit's transformer.

Regardless of transistor type, in looking at more detailed operation and control of power inverter 50 in the context of FIG. 4, one can consider fast switching events, wherein the transformer magnetizing inductance and any secondary filter inductance cause the associated magnetizing and secondary currents to remain relatively constant. For purposes of switching analysis, and with reference to FIG. 5, it therefore is assumed that the total primary current ($I_{L1}+I_{L2}$) is constant over the period of interest. It is also useful to consider the voltage across each of the primary windings ($v_1$, $v_2$) as consisting of a coupled component ($v_{m1}$, $V_{m2}$) plus an uncoupled or leakage component ($v_{l1}$, $V_{l2}$).

By further assuming that the primary winding inductances L1 and L2 are balanced, one can show the following relationships between the two primary windings:

$$v_{l1} = -v_{l2} = \frac{1}{2}(v_1 - v_2), \text{ and}$$

$$v_{m1} = v_{m2} = \frac{1}{2}(v_1 + v_2).$$

These relationships, combined with the assumption of primary current continuity, can be used to aid in visualization of the behavior of the primary circuit during switching. The main insight to be gained is that the voltage that drives changes in the primary winding currents during switching (i.e. the voltage across the combined leakage inductance) is dependent on the difference between the voltages applied to the two halves, L1 and L2, of the primary winding. Minor deviations from the assumptions given above (e.g. unbalanced primary winding inductances, or slight variations in load or magnetizing current during switching events) do not detract materially from the general results thus achieved.

As a starting point for explaining exemplary operation, it is assumed that primary current is initially flowing through power device Q1, and that ESD 62 comprises a snubber capacitor. It must also be understood that the voltage on the snubber capacitor is initially greater than $2V_{dc\_bus}$ and remains there throughout the following process. When Q1 is turned off, the coupling between the transformer primary windings L1 and L2 causes the primary current to transfer to the opposite winding via diode D2, in a process sometimes referred to as commutation. However, the primary leakage inductance causes a delay in the commutation process. During commutation, the leakage inductance of winding L1 forces the current in that winding to initially continue to flow. Because Q1 has been turned off, the L1 current now flows through snubber diode D3.

The connection of L1 to the snubber capacitor via D3 results in a negative driving voltage across primary leakage, which starts to decrease the current in L1. Because the total primary current ($I_{L1}+I_{L2}$) must remain constant, the current in L2 starts to increase at the same time, flowing through diode D2. The driving voltage across primary leakage during this process is:

$$v_{l1} = \frac{1}{2}(v_1 - v_2) = v_{dc\_bus} - \frac{1}{2}v_{snubber\_bus} < 0.$$

This net negative voltage continues to drive a further decrease in $I_{L1}$ and a corresponding increase in $I_{L2}$, until the transfer of current from L1 to L2 is complete. At this point, snubber diode D3 ceases conduction, and the full primary current is carried in diode D2, thereby completing the commutation process.

During the entire Q1 commutation process, the L1 current flowing through diode D3 serves to transfer stored energy from the transformer leakage inductance into the snubber capacitor. At the same time, some amount of additional energy is transferred from the DC bus to the snubber circuit 60, as an unavoidable consequence of the non-zero commutation time. The transfer of energy from primary leakage and from the source into the snubber causes an increase in the snubber capacitor voltage.

During Q1 commutation, the voltage across Q1 rises up to the level of the snubber capacitor, and is clamped there. The current injected into the snubber capacitor during commutation causes a temporary rise in the capacitor voltage, which is offset by the current removed from the capacitor by the intrinsic buck converter 70. Control circuit 58 controls the buck converter circuit 70 (or 72) in such a way that the energy transferred into the snubber capacitor during commutation is removed at the same rate by the buck converter circuit 70 (or 72). This keeps the snubber capacitor operating at a relatively constant voltage level, and prevents the capacitor voltage from rising to an unsafe level. The choice of snubber capacitor operating voltage involves a trade-off between speed of commutation and power device voltage stress.

When Q1 is turned back on (after some period of D2 conduction), the transformer primary current must be commutated from D2 to Q1. Turning on Q1 causes +$V_{dc\_bus}$ to be applied to L1 while −$V_{dc\_bus}$ is applied to L2, for a net driving voltage across leakage of $v_{l1}$=+$V_{dc\_bus}$. This driving voltage causes a rapid transfer of current from L2 to L1. Once the transfer of current from L2 to L1 is complete, diode D2 ceases conduction, and the full primary current is again carried by Q1. It should be noted that the snubber circuit 60 is not required to be active during D2 commutation, since the circuit topology causes D2 to be effectively self-commutating. During the D2 commutation process, the stored leakage energy is transferred from L2 back to the DC bus, while at the same time an equal amount of energy is transferred from the source into L1 leakage.

Exemplary control of the upper corner transistors, i.e., Q3 and Q4, to accomplish exemplary transfer of energy between the snubber circuit 60 and the DC bus is described as follows. The main power transistor Q1 is first turned off; the Q1 commutation process results in the transfer of primary current into D2 and the transfer of primary leakage energy into the snubber capacitor. After the desired D2 conduction interval is complete, main power transistor Q1 is gated back on. At the same time, energy return transistor Q4 is gated on, picking up the primary current flowing in L2 and causing the immediate turn-off of diode D2.

The simultaneous gating of Q1 and Q4 results in a positive driving voltage across the L2 leakage inductance, causing a further increase in the L2 current. Again, the coupling of L1 to L2 requires the total primary current ($I_{L1}+I_{L2}$) to remain constant, so the increase in L2 current is accompanied by a negative current flow in L1 (via diode D1). During this interval, the current flowing through Q4 serves to remove energy from the snubber capacitor, returning part of it directly to the source and transferring part of it into transformer windings L1 and L2.

After the desired amount of energy has been removed from the snubber capacitor, energy return transistor Q4 is turned off, while main power transistor Q1 continues to be gated as before. Turn-off of Q4 causes the current flowing in L2 to be once again picked up by diode D2. The simultaneous conduction of diodes D1 and D2 applies a net driving voltage across leakage of $v_{/1}=+V_{dc\_bus}$, forcing a decrease in L2 current and a corresponding decrease in the magnitude of the negative current flowing in L1. This eventually leads to reversal of the L1 current, so that the L1 current is now carried by Q1. The process continues until D2 commutation is complete, at which time the L2 current falls to zero and all of the transformer primary current is carried by L1/Q1.

Varying the conduction interval of energy return transistor Q4 controls the rate of energy removal from the snubber capacitor. The rate of energy removal is controlled to balance the energy transferred into the snubber circuit 60 during Q1 commutation. It can be shown that snubber energy return via Q4 has the effect of lengthening the time required for commutation of diode D2, and that it also increases the peak current handled by both the transformer T1 and diode D2, as compared with the conventional energy recovery method of FIG. 1.

To mitigate the increase in transformer and diode current required by the modified push-pull topology, one embodiment of the present invention configures switching controller 58 to delay the turn-on of Q4 until after the L2 current has completely commutated from D2 to Q1. That is, in the first case, the turn-on instant of Q4 was made to coincide with the turn-on instant of Q1, but in this second case the turn on instant of Q4 lags the turn on instant of Q1.

Thus, according to this alternate method, the main power transistor Q1 is initially gated on without simultaneously gating on energy return transistor Q4. This initially results in normal commutation of current from D2 to Q1. At some time after D2 commutation has been completed, energy return transistor Q4 is gated on, while keeping main transistor Q1 gated on. This has the effect of again building up current in L2 while decreasing the current in L1. The current flowing in L2 via Q4 removes energy from the snubber capacitor and transfers it to the source and to the transformer primary.

After the desired amount of energy has been removed from the snubber capacitor, energy return transistor Q4 is turned off, while main power transistor Q1 continues to be gated as before. Turn-off of Q4 causes the current flowing in L2 to be picked up by diode D2. The resulting application of negative voltage to winding L2 causes the current in L2 to decrease to zero, while the current in L1 increases back to the level it had attained at the end of D2 commutation. This process completes the return of the additional stored energy from the transformer primary back to the source.

Figure 6A:
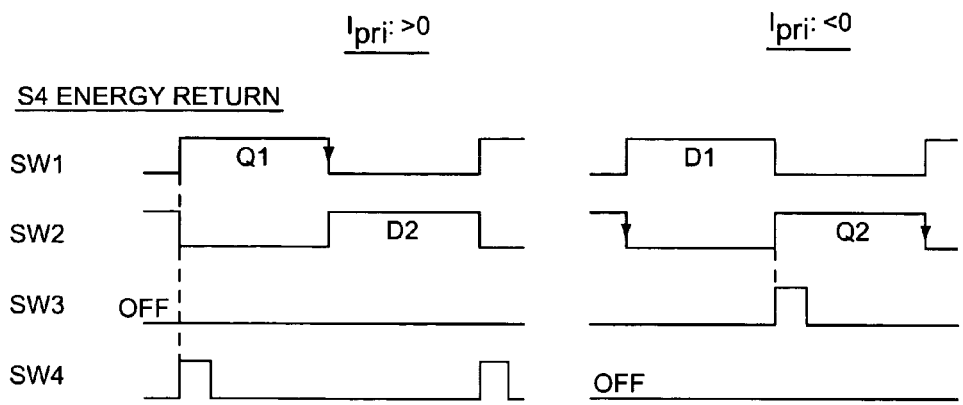
FIGS. 6A–6C are diagrams of exemplary switching control signal timing for different modes of controlling energy transfer between the snubber and push-pull inverter circuits of FIG. 4.
Figure 6B:
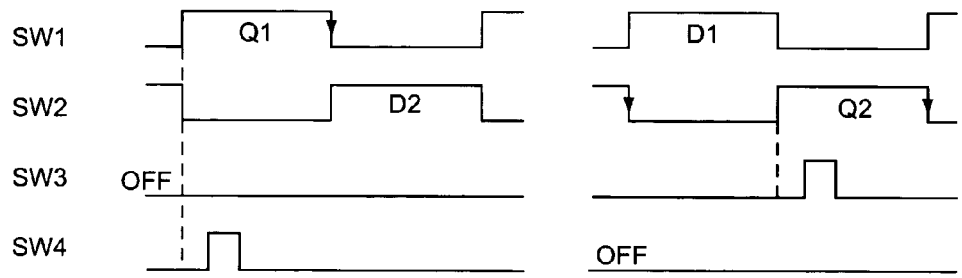

The above exemplary switching control methods, which can be implemented by switching controller 58, or by exemplary external control of power inverter 50, are illustrated in FIGS. 6A and 6B. In general, such control involves timing the respective turn-on of the main and supplemental power switches S1–S4, such as by controlling the respective turn-on of main and supplemental power switches at opposite ends of the primary winding for snubber energy recovery. Alternatively, energy recovery may be performed by controlling the respective turn-on of main and supplemental switches at the same end of the primary winding, although that method of energy recovery requires additional care to prevent "shoot-through" that can occur if the high-side (supplemental) and low-side (primary) switches at the same end of the primary winding are turned on simultaneously.

FIG. 6A illustrates the above first case of energy recovery (opposite-side switching control) wherein the turn-on instant of Q4 was made to coincide with the turn-on instant of Q1. In particular, one sees exemplary switching control for the case where the primary winding current is positive ($I_{pri}>0$), in which case Q4 (switch S4) is briefly pulsed coincident with turn on of Q1 (switch S1) and Q3 (switch S3) remains off. For the case where the primary winding current is negative ($I_{pri}<0$), Q3 is briefly pulsed coincident with turn on of Q2 (switch S2), and Q4 remains off. FIG. 6B illustrates similar logic, except for a controlled turn-on delay of Q4 relative to Q1 and Q3 relative to Q2.

Figure 6C:
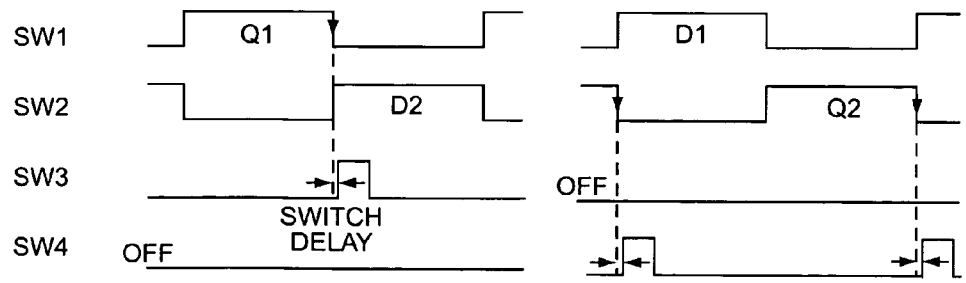

As an example of same-side control, the energy return process can be configured to perform the energy return function immediately after the conclusion of Q1 commutation, instead of waiting until the end of the D2 conduction interval as above. This method performs the return of the energy associated with Q1 commutation via energy return transistor Q3, instead of via Q4. In this method, energy return transistor Q3 is gated on after Q1 is gated off, but at some time before commutation of Q1 is completed. Care must be taken to delay the gating of Q3 sufficiently to avoid the possibility of shoot-through via Q1 and Q3, which would discharge the snubber capacitor and potentially damage the transistors. FIG. 6C illustrates exemplary switching control according to this embodiment for both positive and negative primary winding current.

Q1 commutation according to this alternative embodiment proceeds normally up through the transfer of current from L1 to L2, and then allows the current in L1 to reverse through energy return transistor Q3. The reversal of current in L1 is accompanied by an increase in L2 current above the level attained at the end of the commutation interval. The current flowing in L1 via Q3 removes energy from the snubber capacitor and transfers it to the DC source 54 and to the primary winding of transformer T1. After the desired amount of energy has been removed from the snubber capacitor, energy return transistor Q3 is turned off. Turn-off of Q3 causes the current flowing in L1 to be picked up by diode D1. The resulting application of positive voltage to winding L1 causes the current in L1 to return to zero, while the current in L2 decreases to the level it had attained at the end of D2 commutation. This process completes the return of the additional stored energy from the transformer primary winding back to the DC source 54.

In looking at energy return via Q3 in more detail, one notes that following turn-off of Q1, primary current transfers from L1 to L2 and leakage energy is transferred to the snubber capacitor, much as occurred with the other control methods. During this process, the voltage across Q1 is clamped to the snubber capacitor voltage, which increases as energy is transferred to the capacitor. At the point where L1 current reaches zero, the snubber capacitor voltage stops increasing. The snubber capacitor voltage now begins to decrease as the L1 current reverses and removes energy from the snubber. Turn-off of Q3 causes the energy return process to be completed, concluding with the return of the L1 and L2 currents to their normal post-commutation levels. Then, following the normal D2 conduction interval, D2 commutation occurs after turn-on of Q1.

All of the above described examples of commutation and energy return processes apply for the case where the total primary current Ipri>0, as constrained by the secondary (load) current and transformer magnetizing current. In other words, these examples apply for the case where the main inverter current conduction is handled via transistor Q1 and diode D2. It will be understood that when Ipri<0 (main inverter conduction via Q2/D1), similar operation of the snubber and energy return circuits apply, with the devices on the opposite side of the circuit playing the same roles as those described above.

Of the three exemplary energy recovery methods described above (Q3 energy return, Q4 energy return, Q4 energy return with delay), the Q4 energy return presents a simple control configuration. With the Q4 energy return method, the energy return switches can be turned on in coordination with the opposite corner main power switches, i.e. S4 turned on at the same time as S1, and S3 at the same time as S2. This coordination can be achieved without regard to dead-time control (shoot-through) or primary current polarity issues. The energy return switches S3 and S4 are then held on for a time interval specified by the snubber voltage control, and turned off again at the end of that interval. When operated in this mode, the circuit tends to self-balance, and the fact that one of the energy return switches is turned on unnecessarily (Q3 of S3 in this instance) does not interfere with the normal operation of the inverter circuit 50.

In a further aspect of exemplary switching control contemplated by the present invention, the switching controller 58 reduces start-up related voltage "ring-up" on the snubber capacitor(s) of snubber circuit 60. That is, switching controller 58 controls switches S1 and S2 to pre-charge the snubber bus, or buses, of snubber circuit 60 prior to running the power inverter 50.

To understand the benefits of snubber bus pre-charging, one must first recognize that snubber circuit 60 inherently contains a series resonant circuit formed by the combination of its snubber capacitance with the transformer leakage inductance. When the DC bus powered by supply 54 is initially energized, as long as it is charged at a rate much slower than the resonant frequency of the snubber circuit 60, the snubber capacitor will be charged to a voltage very close to the DC bus voltage. If the inverter 50 is then started, by initially turning on one of the main power switches S1 or S2 for some interval greater than half of the snubber resonance period, then the snubber capacitor voltage will "ring up" to a voltage close to $3V_{dc\_bus}$, where $V_{dc\_bus}$ is the voltage applied to the L1/L2 center tap of the transformer primary winding.

That voltage can be higher than the desired operating point for the snubber capacitor voltage, which is typically not much greater than $2V_{dc\_bus}$. The ring-up of snubber capacitor voltage is accompanied by a large pulse of current through the power switch and the opposite side snubber diode, e.g., a current pulse through Q1/D4 or through Q2/D3. The peak value of the current pulse is limited only by the characteristic impedance presented by the resonant circuit. Again, this can lead to current levels that exceed the capabilities of the power devices used to implement switches S1–S4.

According to the present invention, ring-up of the snubber voltage is eliminated, or at least reduced by pre-charging any snubber capacitor(s) used to implement ESDs 62 in snubber circuit 60 to a desired voltage level, e.g., $2V_{dc\_bus}$. This pre-charging avoids ring-up by matching the driving voltage to the initial conditions of the resonant circuit. Pre-charging can be implemented in power inverter 50 according to the exemplary processing logic illustrated in FIG. 7.

Figure 7:
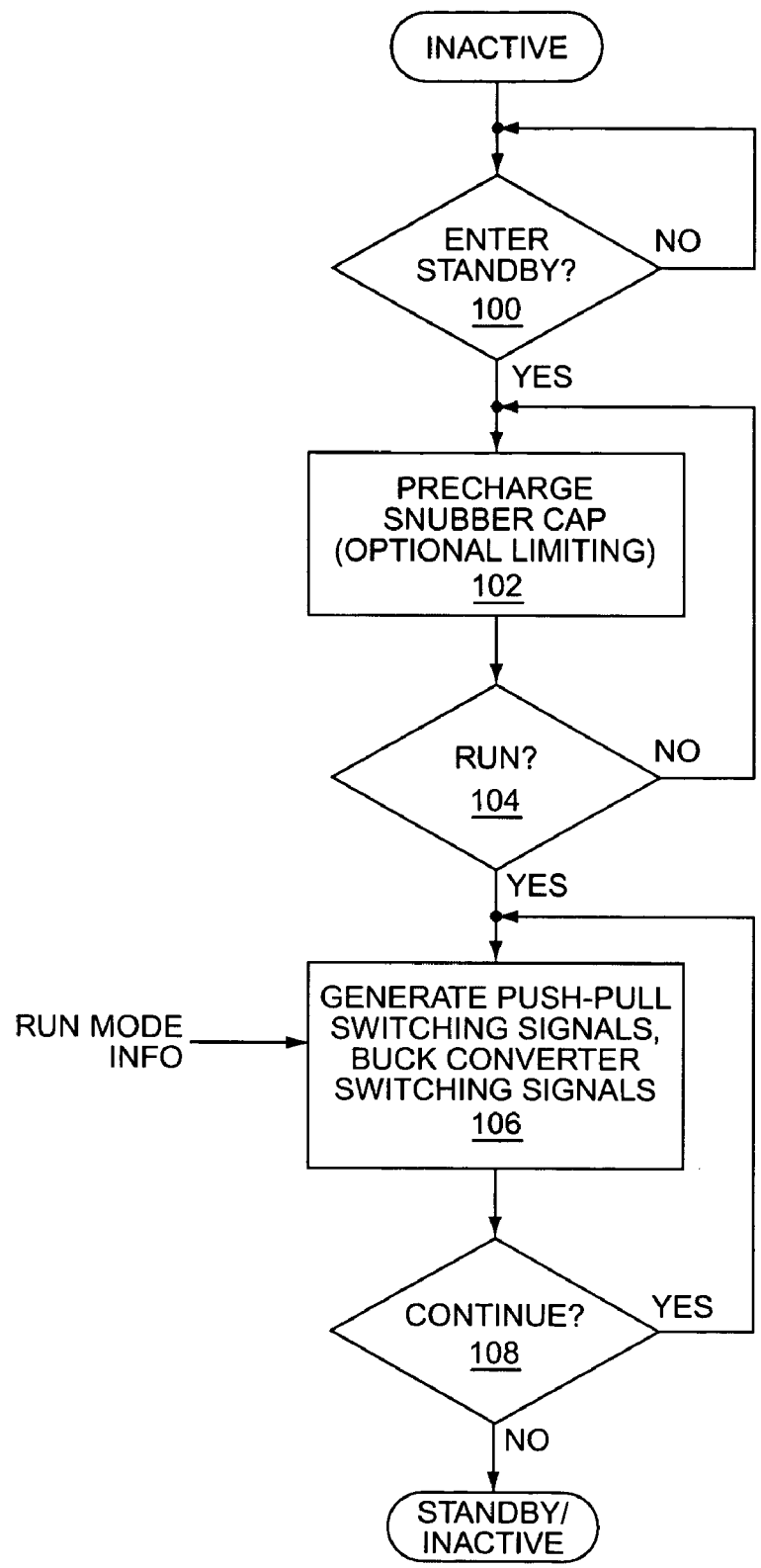
FIG. 7 is a diagram of exemplary snubber capacitor pre-charging logic.

According to the processing logic of FIG. 7, power inverter 50 initially can be in an inactive mode wherein it monitors one or more command inputs to determine whether transition to a standby (pre-run) state is desired (Step 100). Alternatively, the inactive state can be a power-down state, and the transition to standby state operation can be automatic with the application of operating power. In either case, if standby operation is desired, switching controller 58, which can comprise hardware (e.g., a microprocessor circuit and/or digital logic), software, or any combination thereof, begins pre-charging the snubber capacitor (Step 102). Depending on the pre-charging method employed, switching controller 58 can impose voltage limiting on the pre-charge applied.

Switching controller 58 can be configured to maintain snubber capacitor(s) in the snubber circuit 60 in a pre-charge state until transition to the run state (i.e., power inverter 50 actively operating) (Step 104). As part of transitioning the power inverter 50 to run mode operation, switching controller 58 changes from generating pre-charge switching signals for main power switches S1 and S2, to generating push-pull switching signals for the main power switches S1 and S2, i.e., DC-to-AC power conversion switching, according to desired power inverter operating parameters (Step 106). Switching controller 58 further begins generating switching control signals for the energy return switches S3 and S4 of the DC-to-DC converter circuits 70 and 72 in timed coordination with the push-pull switching control signals being generated for main power switches S1 and S2 (Step 106).

Such switching signal generation continues, subject to commanded changes in operating parameters, e.g., output voltage, etc., so long as switching controller 58 detects that continued operation is desired (Step 108). In response to detecting that continued run mode operations no longer are desired, switching controller 58 transitions power inverter 50 to the standby or inactive state.

The general snubber capacitor pre-charging logic outlined above can be implemented in a variety of specific embodiments. In a first exemplary method, one of the main power switches S1 or S2 is repeatedly pulsed on for brief intervals. As noted above, control circuit 58 can be configured to implement pre-charge in advance of power inverter 50 being transitioned from the standby state to the run state. This action builds up moderate amounts of current in the transformer primary leakage inductance, which is subsequently transferred to the snubber capacitor 62.

By way of example, if transistor Q1 is pulsed, then a positive current builds up in L1, along with a corresponding negative current in L2. The amount of current built up is determined by the driving voltage, the leakage inductance, and the conduction time of transistor Q1. When Q1 is subsequently turned off, the current previously built up in winding L1 is transferred to the snubber capacitor via snubber diode D3. The energy stored in the leakage inductance is then transferred to the capacitor, charging it up to a higher voltage.

The process of transferring energy to the capacitor in pulses is repeated continuously at a fixed rate according to switching signals generated by switching controller 58, and it can be shown that the driving voltage approaches zero as the capacitor voltage approaches the desired level of $2V_{dc\_bus}$. This fact means that the charging current pulses decrease as the capacitor voltage increase. The result is that the single switch precharge method is self-limiting, in that even with continuous pulse gating of Q1 (or Q2), the capacitor 62 in snubber circuit 60 will not charge beyond $2V_{dc\_bus}$.

A second method of pre-charging the capacitor is to simultaneously and repeatedly pulse both main power switches (S1 and S2). In this method, the simultaneous conduction of Q1 and Q2 again causes equal and opposite currents to build up in L1 and L2. The amount of current built up is again determined by the driving voltage, the leakage inductance, and the conduction time of the transistors. When the transistors are subsequently turned off, the currents previously built up in windings L1 and L2 are transferred to the snubber capacitor via snubber diodes D3 and D4. The energy stored in the leakage inductance is thereby transferred to the snubber capacitor, again charging it up to a higher voltage.

As before, the process of transferring energy to the snubber capacitor in pulses is again repeated continuously at a fixed rate, preferably under supervision of switching controller 58. In this case, the driving voltage does not depend on the capacitor voltage, only on the applied DC bus voltage, $V_{dc\_bus}$. The charging current therefore remains constant in this method, and the snubber capacitor can be pre-charged to any arbitrarily high level.

In other words, the two-switch precharge method lacks the self-limiting feature of the single switch precharge method. However, switching controller 58 can be configured to receive one or more feedback signals, such as capacitor voltage measurement signals, that it uses to limit the precharge voltage.

On that point, it also should be noted that switching controller 58 can be configured to receive one or more control and/or input signals that command it to different operating states. For example, switching controller 58 can be configured to transition from the inactive state to a standby state, wherein it pre-charges snubber capacitor(s), and then transition to the run state, all responsive to one or more control input signals. In any case, control circuit 58 can be configured to continuously pre-charge snubber capacitor(s) while the inverter 50 is held in the standby or idle mode, so that inverter 50 remains ready to operate as soon as a run command is received.

In the embodiments described above, the snubber circuit 60 uses one or more snubber capacitors as ESDs 62, i.e., one or more snubber capacitors are used as intermediate energy storage elements for the energy return system implemented by DC-to-DC converters 70 and/or 72. It should also be understood that batteries, fuel cells, photovoltaic cells, or other DC energy sources or storage devices could be used in place of the snubber capacitors, or in combination with them.

That is, devices other than capacitors, or in addition to them, can be used for energy storage in the snubber circuit 60. For example, FIG. 8A illustrates the use of a single snubber bus wherein ESD 62 is implemented as a capacitor, while FIG. 8B illustrates a similar snubber circuit implementation, but where ESD 62 is implemented using one or more batteries. Additionally, FIG. 8C illustrates a single snubber bus, but where ESD 62 is implemented using a parallel combination of one or more capacitors and one or more batteries. As noted before, with a single snubber bus, one can elect to implement just one of the DC-to-DC converters 70 and 72 described herein.

In contrast to the single-bus configurations of snubber circuit 60 described above, FIGS. 8D and 8E illustrate two snubber buses, one for the DC-to-DC converter circuit 70 formed using switch S3 and one for the DC-to-DC converter circuit 72 formed using switch S4. One snubber bus is associated with ESD 62A, which can comprise one or more snubber capacitors and/or batteries, and the other snubber bus is associated with ESD 62B, which similarly can comprise one or more capacitors and/or batteries. Of course, either or both the DC-to-DC converter circuits 70 and 72 can be coupled to multiple snubber buses.

In embodiments where snubber circuit 60 uses one or more batteries for energy storage, switching controller 58 can be configured to provide boost-mode DC-to-DC conversion, wherein energy is transferred to the snubber circuit 60 by operation of the power inverter circuit 52. FIG. 9 illustrates exemplary boost mode operation of switching controller 58.

A small net amount of leakage energy/power is naturally transferred from the DC bus to the snubber bus during operation of power inverter 50 in dependence on the amount of AC power being controlled by power inverter 50. However, switching control circuit 58 can be configured to effect a desired amount of additional DC-to-DC power transfer to the snubber bus, such as for battery charging, by partially overlapping the conduction of switches S1 and S2, i.e., by partially overlapping the turn-on times of Q1 and Q2, similar to the controlled S1/S2 switching described for snubber bus pre-charging described earlier herein.

In general, depending on the specific DC bus, snubber bus, and AC bus port voltages, and on the specific power flow requirements, the main power switches S1 and S2, and the supplemental power switches S3 and S4, can be controlled by the switching controller 58 to effect any desired amount and direction of power flow. That is, the push-pull inverter circuit 52 and energy recovery circuits described herein (converters 70 and 72) enables switching control circuit 58 to independently control the voltages $v_{Q1}$ and $v_{Q2}$ applied to the two ends of the primary winding of transformer T1. Therefore, switching control circuit 58 can independently control the common mode voltage $v_{CM} = (v_{Q1}+V_{Q2})/2$ and the differential mode voltage $V_{DM}=(V_{Q1}-V_{Q2})/2$ applied to the transformer primary. The differential and common mode voltages can be set by operation of switching control circuit 58.

The differential mode voltage, in combination with the series inductance in the primary-secondary path, is used to control the flow of power between the DC bus and the AC bus (the AC mains). Additionally, the common mode voltage, in combination with the primary leakage inductance and any series inductance in the snubber bus is used to control the flow of power between the DC bus and the snubber bus. The combination of the two modes further allows controlling the transfer of energy between the snubber bus and the AC bus, if such transfer is desired.

It should be understood that switching controller 58 can be configured to receive command values corresponding to desired power inverter operation, such as setpoints for AC voltage outputs, etc. Further, it should be understood that switching controller 58 can be configured to include, or be associated with, one or more feedback circuits that provide, for example, indications of the common-mode and differential-mode voltages of the primary winding. Additional sensing circuits can be used to obtain feedback from the snubber bus and/or the AC bus. Such sensing permits the switching controller 58 to control the primary and supplemental power switches based on controlling the observed common-mode and differential-mode voltages.

Regardless of the particular variables used for control feedback, and regardless of the particular feedback circuits used, switching control circuit 58 can be configured to effect a combination of switching controls, such as those illustrated by FIGS. 6A–6C and by FIG. 9, so that power inverter 50 can be operated as a multi-port power flow device. With multi-port power flow control, power can be transferred into or out of any one or more of the snubber, DC, and AC buses, as needed or desired. In general, then, with the availability of batteries or the like in snubber circuit 60, the push-pull inverter topology embodied in the present invention is effectively expanded from a two-port (AC bus and DC bus) to at least a three-port (AC bus, DC bus and one or more snubber buses) energy conversion system.

Such multi-port topologies are useful when working with power-limited sources such as those found in alternative energy or distributed generation power systems. For instance, such a topology could allow the power inverter 50 to provide a battery charger/battery backup function, or additionally to provide power to auxiliary loads, in addition to the normal AC power control function. FIG. 10 illustrates an exemplary three-port power flow diagram, wherein switching controller 58 can be configured to independently control power flow among the DC bus, the AC bus, and the snubber bus.

In at least some embodiments, it is desirable to operate power inverter 50 with a minimum (discharged) battery voltage of no less than $2V_{dc\_bus}$, to permit operation of the push-pull inverter circuit 52 in the normal push-pull mode with minimal power flow out of the snubber bus port. However, it is still possible to maintain full control at any snubber bus voltage greater than $V_{dc\_bus}$, albeit with some reduction in the available AC output voltage dynamic range. If necessary, bi-directional power flow on either the DC bus or the snubber bus can be blocked by a properly oriented series diode included in power inverter 50.

When operated as a three-port device, there is a potential design conflict, or trade-off, between the desire for low primary-primary leakage (to minimize the parasitic energy recovery requirement when operating in the normal push-pull mode) and the desire for a moderate value of primary-primary leakage to act as a buffering impedance between the DC bus and the snubber bus. It can be advantageous to keep the transformer windings of transformer T1 tightly coupled and to continue to use a snubber capacitor in snubber circuit 60 as described previously, but to add a series inductance between the snubber capacitor and a battery included in the snubber circuit 60 to provide the buffering impedance. This buffering impedance can be partly provided by the internal impedance of the battery itself.

The above non-limiting examples focused on single-phase push-pull inverter structures, described exemplary energy transfer methods using DC-to-DC converter circuits formed using the inverter circuit's transformer, and described bi-directionality of power flow between the AC mains and the DC bus. However, it should be understood that the present invention further encompasses push-pull inverters comprising multiple parallel windings, each equipped with a static switching means. Further, the present invention can be applied to a push-pull inverter containing a plurality of phases, with each transformer arm constructed either from a single winding or from multiple parallel windings. The general applicability of the present invention to these and other embodiments will be clear to those skilled in the art.

In general, then, an exemplary embodiment of the present invention comprises a power inverter 50 comprising a push-pull inverter circuit 52 that includes one or more DC-to-DC converter circuits, e.g., converters 70 and/or 72, that are configured to control energy transfer between the snubber bus and the DC bus. More broadly, the power inverter 50 can be configured to provide multi-port power flow control between the DC bus, the AC bus, and one or more snubber buses.

Methods and circuits disclosed herein make clear that one or both DC-to-DC converter circuits 70 and 72 can be implemented. Further, as detailed herein, switching controller 58 can be configured to operate the supplemental power switches to effect buck-mode energy recovery, wherein energy is transferred from the snubber bus to the DC bus, or to operate the main power switches to effect boost-mode energy transfer and/or pre-charge control, wherein energy is transferred from the DC bus to the snubber bus. Such control variations are achieved by configuring switching control circuit 58 to control the relative turn-on times of the main and supplemental switches S1–S4.

As such the present invention is not limited by the foregoing discussion and accompanying drawings, which describe exemplary embodiments of a power inverter configured according to the present invention. Rather, the present invention is limited by the following claims and the reasonable equivalents thereof.

What is claimed is:

1. A power inverter comprising:
   a DC-to-AC converter circuit including a transformer having a primary winding coupled to a DC bus and a secondary winding coupled to an AC bus, said primary winding having a first switch and first free-wheeling diode coupled to a first end, and a second switch and second free-wheeling diode coupled to a second end;
   a snubber circuit coupled to each end of the primary winding, and configured to limit voltage transients on the primary winding; and
   a third switch coupling the first end of the primary winding to the snubber circuit, thereby forming a first DC-to-DC converter from the third switch, the primary winding, and the first free-wheeling diode, said first DC-to-DC converter operative to control energy transfer between the snubber circuit and the DC-to-AC converter circuit.

2. The power inverter of claim 1, further comprising a fourth switch coupling the second end of the primary winding to the snubber circuit, thereby forming a second DC-to-DC converter from the fourth switch, the primary winding, and the second free-wheeling diode, said second DC-to-DC converter operative to control energy transfer between the snubber circuit and the DC-to-AC converter circuit.

3. The power inverter of claim 2, further comprising a switching controller configured to generate switching control signals for the first and second DC-to-DC converters to control energy transfer between the snubber circuit and the DC-to-AC converter circuit.

4. The power inverter of claim 1, further comprising a switching controller configured to generate switching control signals for the first and second switches in a pre-charge mode of power inverter operation to effect a desired pre-charging of snubber circuit.

5. The power inverter of claim 1, further comprising a switching controller configured to generate switching control signals for the third switch that are in timed coordination with switching control signals generated for one or both the first and second switches, to effect a desired amount of energy transfer between the snubber circuit and the DC-to-AC circuit.

6. The power inverter of claim 1, further comprising a switching controller configured to generate switching control signals for the first, second, and third switches, such that the first DC-to-DC converter operates as a buck converter that returns energy from the snubber circuit to the DC-to-AC converter circuit.

7. A power inverter comprising:
a push-pull inverter circuit comprising an inverter circuit transformer having a switched primary winding with a first switch and first free-wheeling diode at a first end of the primary winding and a second switch and second free-wheeling diode at a second end of the primary winding;
a snubber circuit to limit voltage transients on the primary winding; and
a first DC-to-DC converter circuit formed using the primary winding and operative to control energy transfer between the snubber circuit and the push-pull inverter circuit.

8. The power inverter of claim 7, wherein first and second switches comprise first and second transistor switches, each having an associated diode, and wherein the first free-wheeling diode comprises the diode associated with the first transistor switch and the second free-wheeling diode comprises the diode associated with the second transistor switch.

9. The power inverter of claim 7, wherein the first DC-to-DC converter circuit includes a third switch coupling an energy storage device of the snubber circuit to the first end of the primary winding, such that the first DC-to-DC converter circuit is formed from the third switch, the primary winding, and the first free-wheeling diode.

10. The power inverter of claim 9, wherein the third switch comprises a transistor switch that includes an associated diode, and wherein that associated diode serves as a snubber diode connecting the first end of the primary winding to the snubber circuit.

11. The power inverter of claim 9, wherein the first and third switches comprise a half-bridge transistor circuit including a high-side transistor switch serving as the third switch coupling the first end of the primary winding to the snubber circuit and a low-side transistor switch serving as the first switch coupling the first end of the primary winding to a DC return node.

12. The power inverter of claim 11, wherein a diode associated with the high-side transistor switch serves as a snubber diode for the first end of the primary winding, and wherein a diode associated with the low-side transistor switch serves as the first free-wheeling diode.

13. The power inverter of claim 7, further comprising a second DC-to-DC converter circuit formed using the primary winding and operative to control energy transfer between the snubber circuit and the push-pull inverter circuit, said first DC-to-DC converter circuit formed at the first end of the primary winding and said second DC-to-DC converter circuit formed at the second end of the primary winding.

14. The power inverter of claim 13, wherein the first DC-to-DC converter circuit includes a third switch coupling an energy storage device of the snubber circuit to the first end of the primary winding, such that the first DC-to-DC converter circuit is formed from the third switch, the primary winding, and the first free-wheeling diode, and wherein the second DC-to-DC converter circuit includes a fourth switch coupling an energy storage device of the snubber circuit to the second end of the primary winding, such that the second DC-to-DC converter circuit is formed from the fourth switch, the primary winding, and the second free-wheeling diode.

15. The power inverter of claim 14, wherein the first and third switches comprise low-side and high-side transistor switches, respectively, in a half-bridge transistor circuit, and wherein the second and fourth switches comprises low-side and high-side transistor switches, respectively in a half-bridge transistor circuit.

16. The power inverter of claim 15, wherein diodes included with each low-side transistor switch serve as the first and second free-wheeling diodes, and wherein diodes included with the high-side transistor switches serve as snubber diodes coupling the first and second ends of the primary winding to the snubber circuit.

17. The power inverter of claim 14, wherein the first through fourth switches comprise first through fourth transistors in a full-bridge transistor circuit.

18. The power inverter of claim 7, further comprising a control circuit configured to generate push-pull switching control signals to control the push-pull inverter circuit, and further configured to generate a DC-to-DC converter switching control signal in timed coordination with the push-pull switching control signals to control energy transfer between the push-pull inverter circuit and an energy storage device of the snubber circuit.

19. A power inverter comprising:
a push-pull inverter circuit comprising a transformer having a primary winding coupled to a DC bus and a secondary winding coupled to an AC bus, main power switches coupling each end of the primary winding to a DC return, and one or more supplemental power switches coupling at least one end of the primary winding to a snubber circuit of the power inverter; and
a switching controller configured to control power flow between the DC, AC, and snubber buses by controlling a common-mode and differential-mode voltages of the primary winding via switching control of the main and supplemental power switches.

20. The power inverter of claim 19, wherein the switching controller is configured to recover energy from the snubber circuit by controlling the one or more supplemental power switches in timed coordination with the main power switches.

21. The power inverter of claim 19, wherein the switching controller is configured to operate in a run mode, wherein it carries out desired power conversion operations, and to operate in a pre-charge mode before transitioning to the run mode, wherein it pre-charges an energy storage device of the snubber circuit by switching the main power switches to effect power flow from the DC bus to the snubber bus.

22. The power inverter of claim 21, wherein the power inverter is configured to pre-charge the energy storage device to a desired voltage level, and maintain the energy storage device substantially at that desired voltage level while operating in the pre-charge mode.

23. The power inverter of claim 19, wherein the switching controller is configured to control the differential-mode voltage of the primary winding to effect desired power flow between the DC and AC buses.

24. The power inverter of claim 19, wherein the switching controller is configured to control the common-mode voltage of the primary winding to effect desired power flow between the DC and snubber buses.

25. The power inverter of claim 19, wherein the switching controller is configured to control the common-mode and differential-mode voltages of the primary winding to effect desired power flows between the DC, AC, and snubber buses.

26. The power inverter of claim 19, wherein the switching controller is configured to effect desired power flow from the snubber bus to the DC bus by controlling the respective on-times of the main and supplemental power switches at opposite ends of the primary winding.

27. The power inverter of claim 19, wherein the switching controller is configured to effect desired power flow from the snubber bus to the DC bus by controlling the respective on-times of the main and supplemental power switches at a same end of the primary winding.

* * * * *